(12) United States Patent
Wada

(10) Patent No.: US 7,787,047 B2
(45) Date of Patent: Aug. 31, 2010

(54) IMAGE PROCESSING APPARATUS AND IMAGE PROCESSING METHOD

(75) Inventor: Takashi Wada, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 12/359,110

(22) Filed: Jan. 23, 2009

(65) Prior Publication Data

US 2010/0026890 A1    Feb. 4, 2010

(30) Foreign Application Priority Data

Aug. 4, 2008    (JP)    ............................. 2008-201203

(51) Int. Cl.
*H04N 11/20* (2006.01)
(52) U.S. Cl. .................. 348/448; 348/450; 348/458
(58) Field of Classification Search ................ 348/448, 348/452, 450, 453, 581, 65, 71, 655, 656, 348/252–254, 333.1, 223.1, 674, 458; 382/298–300, 382/266, 275, 167; 345/589, 606, 610, 611, 345/613, 660, 667
See application file for complete search history.

(56) References Cited

U.S. PATENT DOCUMENTS

| | | | | |
|---|---|---|---|---|
| 4,967,271 | A * | 10/1990 | Campbell et al. | ............ 348/701 |
| 5,428,398 | A * | 6/1995 | Faroudja | ..................... 348/452 |
| 5,742,350 | A * | 4/1998 | Pan et al. | ..................... 348/453 |
| 5,864,367 | A * | 1/1999 | Clatanoff et al. | ............. 348/441 |
| 6,348,950 | B1 * | 2/2002 | Kishida | ....................... 348/458 |
| 6,853,748 | B2 * | 2/2005 | Endo et al. | ................... 382/167 |
| 7,050,498 | B2 | 5/2006 | Ito et al. | |
| 7,266,254 | B2 | 9/2007 | Ishikawa et al. | |
| 7,373,020 | B2 * | 5/2008 | Tsukioka | .................... 382/300 |
| 2006/0132649 | A1 * | 6/2006 | Miyazawa | .................. 348/458 |
| 2006/0233516 | A1 | 10/2006 | Kimura | |
| 2010/0091184 | A1 * | 4/2010 | Nitta | ........................... 348/448 |

FOREIGN PATENT DOCUMENTS

| | | |
|---|---|---|
| JP | 10-191208 | 7/1998 |
| JP | 2000-188680 | 7/2000 |
| JP | 2000-307594 | 11/2000 |

(Continued)

OTHER PUBLICATIONS

Japanese Patent Application No. 2008-201203, Notice of Rejection, mailed May 26, 2009 (Partial English translation of Office Action).

*Primary Examiner*—Victor Kostak
(74) *Attorney, Agent, or Firm*—Blakely, Sokoloff, Taylor & Zafman LLP

(57) ABSTRACT

According to one embodiment, an image processing apparatus includes a resolution increasing module and a moving-image improving module. The resolution increasing module performs, on receipt of a first video signal with first resolution, super resolution conversion on the first video signal to obtain a second video signal with second resolution that is higher than the first resolution by estimating an original pixel value from the first video signal and increasing pixels. The resolution increasing module also performs first correction on the second video signal obtained by the super resolution conversion. The moving-image improving module configured to perform, on the second video signal subjected to the first correction, second correction except for a correction process included in the first correction.

8 Claims, 6 Drawing Sheets

FOREIGN PATENT DOCUMENTS

| | | |
|---|---|---|
| JP | 2001-014119 | 1/2001 |
| JP | 2002-073436 | 3/2002 |
| JP | 2002-230574 | 8/2002 |
| JP | 2003-179821 | 6/2003 |
| JP | 2003-209808 | 7/2003 |
| JP | 2003-309719 | 10/2003 |
| JP | 2003-333502 | 11/2003 |
| JP | 3926685 | 1/2004 |
| JP | 2005-236633 | 9/2005 |
| JP | 2006-279262 | 10/2006 |
| JP | 2007-052672 | 3/2007 |
| JP | 2007-310837 | 11/2007 |
| JP | 2008-035404 | 2/2008 |
| JP | 2008-098803 | 4/2008 |

* cited by examiner

| PROCESSING FUNCTION | RESOLUTION INCREASING MODULE | MOVING-IMAGE IMPROVING MODULE |
|---|---|---|
| GAMMA CORRECTION | ○ | × |
| WHITE BALANCE ADJUSTMENT | ○ | ○ |
| ⋮ | ⋮ | ⋮ |

| COLOR TEMPERATURE | BALANCE VALUE |
|---|---|
| 9300 (K) | -15 TO +15 |
| 6500 (K) | -15 TO +15 |
| 5000 (K) | -15 TO +15 |

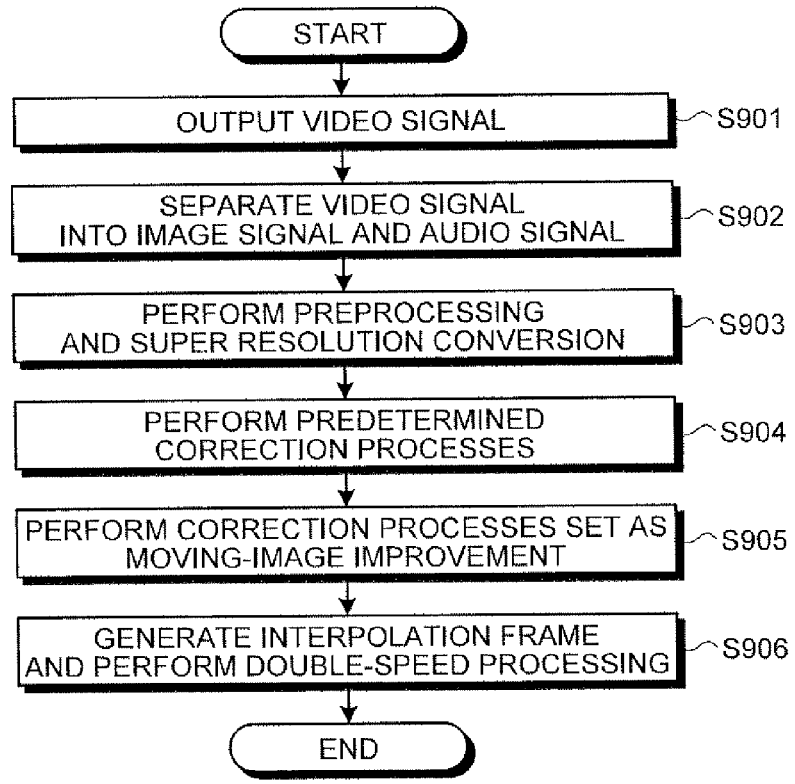
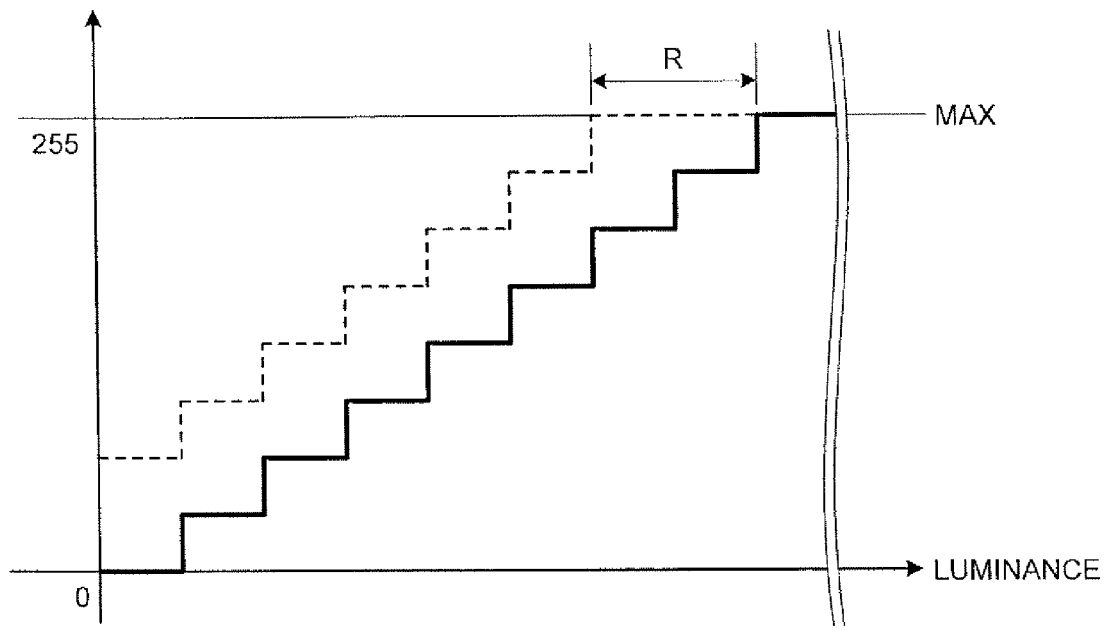

IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2008-201203, filed Aug. 4, 2008, the entire contents of which are incorporated herein by reference.

BACKGROUND

1. Field

One embodiment of the invention relates to a technology for increasing resolution of an image and, more particularly, to a technology for correcting an image with increased resolution.

2. Description of the Related Art

Televisions have been used to display video images. A television performs high-resolution (resolution increasing) processing for converting a standard definition (SD) image to a high-resolution and high definition (HD) image, or double-speed processing for smooth display of a moving video image, i.e., moving-image improvement. After the processing, to further improve image quality, image corrections such as gamma correction and white balance adjustment are performed on the image subjected to the high-resolution processing or the moving-image improvement.

For example, Japanese Patent Application Publication (KOKAI) Nos. 2002-230574, H10-191208, and 2006-279262 disclose technologies for such image corrections performed on an image subjected to the high-resolution processing or the moving-image improvement.

An old-fashioned television does not have the function of performing the double-speed processing as well as the high-resolution processing according to the super resolution technology as described above. Therefore, when an image correction is performed in either the moving-image improvement or the high-resolution processing, the processing result does not adversely affect image quality.

If it is assumed that the moving-image improvement and super-resolution processing are performed by a television as, for example, in the case where the moving-image improvement is performed after white balance adjustment in the super-resolution processing, the pixel value of a high-luminance pixel exceeds the dynamic range due to white balance adjustment in the moving-image improvement. More specifically, even if white balance adjustment is originally performed appropriately within the dynamic range, when white balance adjustment is performed on the high-luminance pixel in a range R exceeding a certain threshold after white balance adjustment in the super-resolution processing, its pixel value exceeds the maximum value of the dynamic range. This results in "clipped highlights". That is, if a television, which is capable of performing the moving-image improvement and the super-resolution processing and has the function of performing a similar correction process in both of them, performs the correction process in the high-resolution processing, an image is erroneously processed by the moving-image improvement.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 9 is another exemplary flowchart of image corrections including the same correction processes in the embodiment; and FIG. 10 is an exemplary graph illustrating clipped highlights when the same correction process (white balance adjustment) is performed in super-resolution processing as well as double-speed processing in the embodiment.

DETAILED DESCRIPTION

Figure 1:
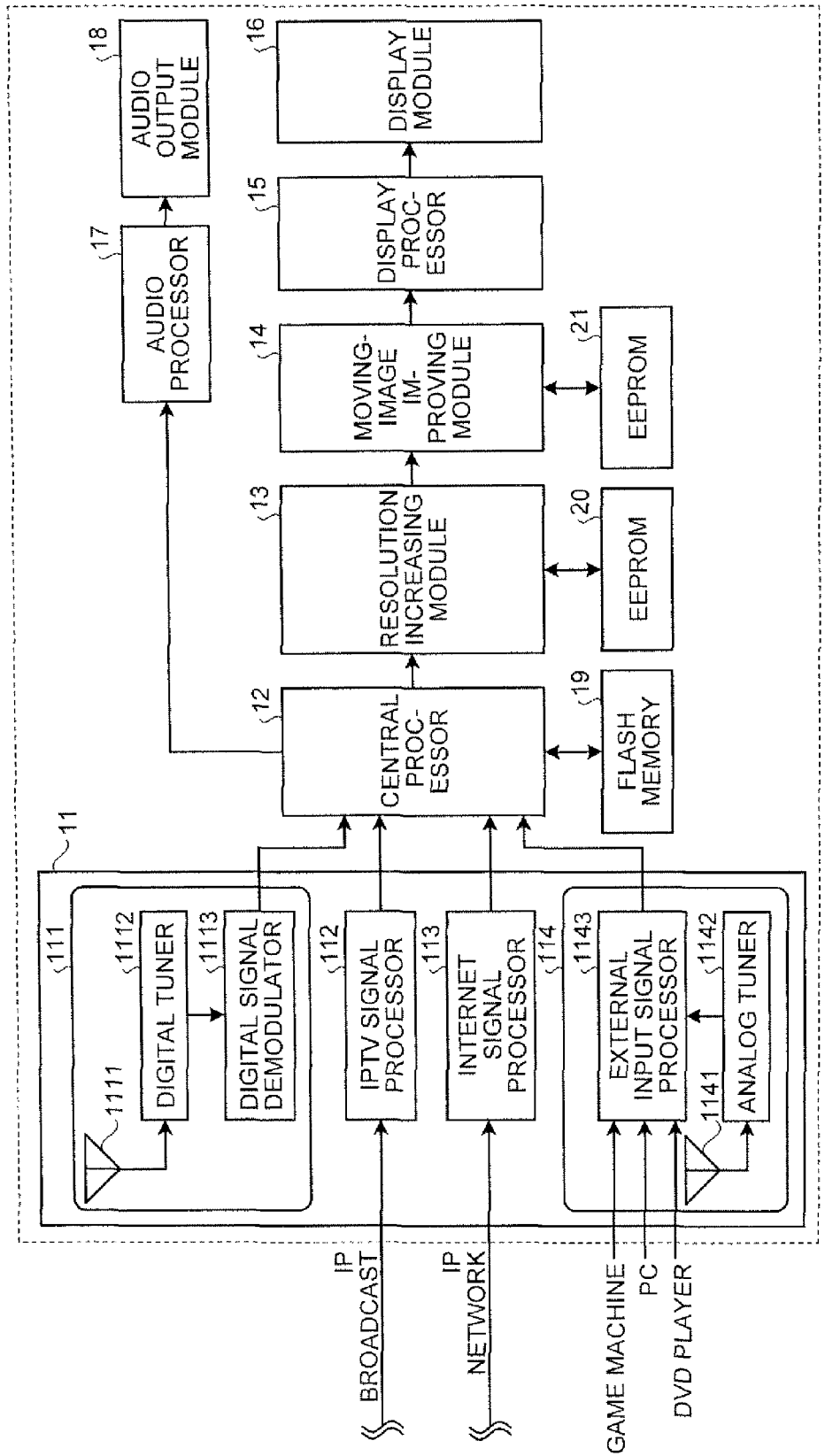
FIG. 1 is an exemplary block diagram of an image display apparatus according to an embodiment of the invention.

Various embodiments according to the invention will be described hereinafter with reference to the accompanying drawings. In general, according to one embodiment of the invention, an image processing apparatus comprises a resolution increasing module, a moving-image improving module, and a controller. The resolution increasing module is configured to perform, on receipt of a first video signal with first resolution, super resolution conversion on the first video signal to obtain a second video signal with second resolution that is higher than the first resolution by estimating an original pixel value from the first video signal and increasing pixels, and perform first correction on the second video signal obtained by the super resolution conversion. The moving-image improving module is configured to perform moving-image improvement processing on the second video signal obtained by the super resolution conversion subjected to the first correction, and perform second correction on the second video signal before or after the moving-image improvement processing. The controller is configured to determine whether the first correction comprises a matching correction process that matches a correction process comprised in the second correction, and, when the first correction comprises a matching correction process, control the resolution increasing module not to perform the matching correction process.

According to another embodiment of the invention, an image processing apparatus comprises a resolution increasing module, a moving-image improving module, and a controller. The resolution increasing module is configured to perform super resolution conversion on a first video signal with first resolution to obtain a second video signal with second resolution that is higher than the first resolution, and perform first correction on the second video signal obtained by the super resolution conversion. The moving-image improving module is configured to perform moving-image improvement processing on the second video signal obtained by the super resolution conversion subjected to the first correction, and perform second correction on the second video signal before or after the moving-image improvement processing. The controller is configured to determine whether the first correction comprises a matching correction process that matches a correction process comprised in the second correction, and, when the first correction comprises a matching correction process, control the resolution increasing module not to perform the matching correction process.

According to still another embodiment of the invention, an image processing apparatus comprises a resolution increasing module and a moving-image improving module. The resolution increasing module comprises a super-resolution converter configured to perform, on receipt of a first video signal with first resolution, super resolution conversion on the first video signal to obtain a second video signal with second resolution that is higher than the first resolution by estimating an original pixel value from the first video signal and increasing pixels, and a first corrector configured to perform correction on either the first video signal or the second video signal. The moving-image improving module comprises a moving-image improver configured to receive the second video signal and perform moving-image improvement on the second video signal, and a second corrector configured to perform correction on the second video signal before or after the moving-image improvement processing. When a correction process performed by the first corrector matches a correction process performed by the second corrector, the first corrector does not perform the correction process, while the second corrector performs the correction including the correction process.

According to still another embodiment of the invention, an image processing method comprises: performing, on receipt of a first video signal with first resolution, super resolution conversion on the first video signal to obtain a second video signal with second resolution that is higher than the first resolution by estimating an original pixel value from the first video signal and increasing pixels; performing first correction on the second video signal obtained by the super resolution conversion; performing moving-image improvement processing on the second video signal obtained by the super resolution conversion subjected to the first correction; performing second correction on the second video signal before or after the moving-image improvement processing; determining whether the first correction comprises a matching correction process that matches a correction process comprised in the second correction; and controlling the resolution increasing module not to perform the matching correction process when the first correction comprises a matching correction process.

FIG. 1 is a schematic block diagram of an image display apparatus 100 according to an embodiment of the invention. As illustrated in FIG. 1, the image display apparatus 100 comprises a video signal input module 11, a central processor 12, a resolution increasing module 13, a moving-image improving module 14, a display processor 15, a display module 16, an audio processor 17, an audio output module 18, a flash memory 19, an electrically erasable programmable read-only memory (EEPROM) 20, and an EEPROM 21. The resolution increasing module 13 corresponds to an image processing apparatus.

The video signal input module 11 comprises a digital broadcast receiver 111, an Internet protocol television (IPTV) signal processor 112, an Internet signal processor 113, and an external input module 114. The digital broadcast receiver 111 receives an video signal to be displayed. The Internet signal processor 113 receives data transmitted through an IP network such as the Internet. The external input module 114 receives input of an analog signal. The term "video signal" as used herein includes audio signals as well as image signals such as still image signals and moving image signals.

The digital broadcast receiver 111 comprises a digital antenna 1111, a digital tuner 1112, and a digital signal demodulator 1113. The digital antenna 1111 receives digital broadcasting such as BS broadcasting, CS broadcasting, and digital terrestrial broadcasting. The digital tuner 1112 is used to select a digital broadcast channel. The digital signal demodulator 1113 demodulates a digital broadcast signal, and outputs it to the central processor 12 as a digital video signal.

The IPTV signal processor 112 receives IP broadcasting transmitted over a dedicated IP network, and outputs it to the central processor 12 as a digital video signal.

The Internet signal processor 113 receives data (still image, moving image, etc.) transmitted through an IP network such as the Internet, and outputs it to the central processor 12 as a digital video signal.

The external input module 114 comprises an analog antenna 1141, an analog tuner 1142, and an external input signal processor 1143. The analog antenna 1141 receives analog broadcasting. The analog tuner 1142 is used to select an analog broadcast channel. The external input signal processor 1143 performs signal processing, such as A/D conversion, on an analog signal, and outputs it to the central processor 12 as a digital video signal. The external input signal processor 1143 is provided with a terminal (not shown) for connection to an external device such as a game machine, a personal computer (PC), a digital versatile disk (DVD) player. The external input signal processor 1143 performs the signal processing also on an analog signal received from an external device through the terminal.

Figures 2, 3:
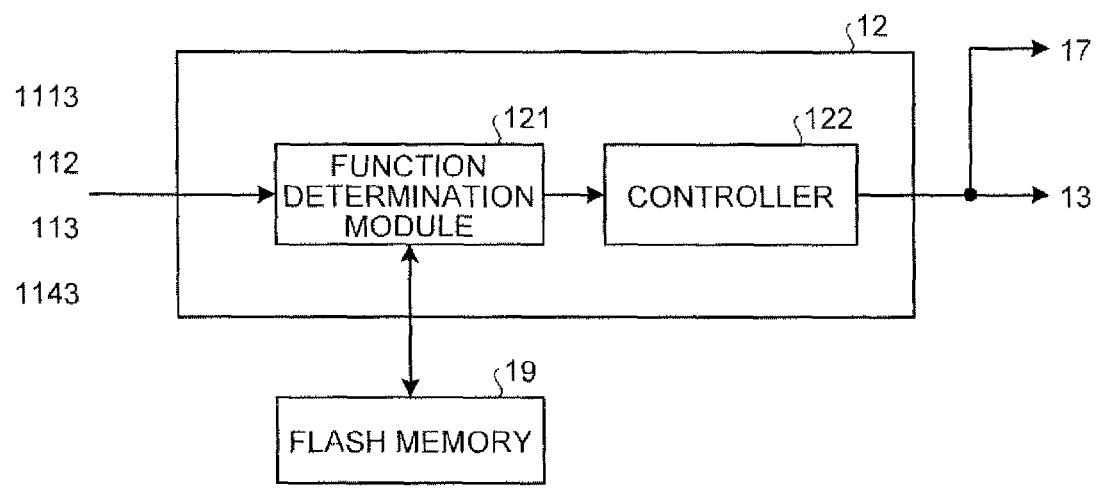
FIG. 2 is an exemplary block diagram of a central processor illustrated in FIG. 1.
FIG. 3 is an exemplary diagram of a function association table stored in a flash memory illustrated in FIG. 2.

FIG. 2 is a functional block diagram of the central processor 12. As illustrated in FIG. 2, the central processor 12 comprises a function determination module 121, a controller 122, and the flash memory 19.

The flash memory 19 previously stores a table (hereinafter, "function association table") that associates correction processes, such as gamma correction and white balance adjustment, of the resolution increasing module 13 with those of the moving-image improving module 14. When the video signal input module 11 receives a video signal, the function determination module 121 refers to the function association table to check whether there is a matching process between correction processes to be performed by the resolution increasing module 13 and those to be performed by the moving-image improving module 14. Although gamma correction and white balance adjustment are cited below as examples of the correction processes, the correction processes may include various other image correction processes such as tone or gray-level correction and contrast enhancement.

FIG. 3 is an example of the function association table stored in the flash memory 19. As illustrated in FIG. 3, the function association table stores correction processes each in association with the modules (either or both the resolution increasing module 13 and the moving-image improving module 14) that perform the correction process. In the example of FIG. 3, the resolution increasing module 13 is capable of both gamma correction and white balance adjustment, while the moving-image improving module 14 is capable only of white balance adjustment.

The function determination module 121 is described above as determining a matching process between the correction processes to be performed by the resolution increasing module 13 and those to be performed by the moving-image improving module 14 referring to the function association table. However, even if the moving-image improving module 14 is capable of, for example, white balance adjustment, there is a case that the moving-image improving module 14 is disabled from performing white balance adjustment (white balance adjustment is set to "OFF"), or the entire functions thereof is disabled (the functions is set to "OFF"). Accordingly, the function determination module 121 may make the determination by checking the availability of each functional module of the moving-image improving module 14 and the correction processes thereof.

Upon determining that there is a matching process between the correction processes to be performed by the resolution increasing module 13 and the moving-image improving module 14, the function determination module 121 outputs an identification signal indicating the matching process to the controller 122 with the video signal received from the video signal input module 11. On the other hand, when determining that there is no matching process between the correction processes to be performed by the resolution increasing module 13 and the moving-image improving module 14, the function determination module 121 outputs only the video signal to the controller 122. In this case, the function determination module 121 may output an identification signal indicating that there is no matching process to the controller 122 with the video signal.

The controller 122 separates the video signal received from the function determination module 121 into an image signal and an audio signal. The controller 122 outputs the image signal subjected to predetermined image processing to the resolution increasing module 13, which will be described later, as well as outputting the audio signal to the audio processor 17. If receiving the identification signal indicating the matching process from the function determination module 121, the controller 122 outputs the identification signal to the resolution increasing module 13.

Examples of the image processing that the controller 122 performs on the image signal include scaling to convert the resolution of the image signal to a predetermined value (e.g., 1280×720).

Figure 4:
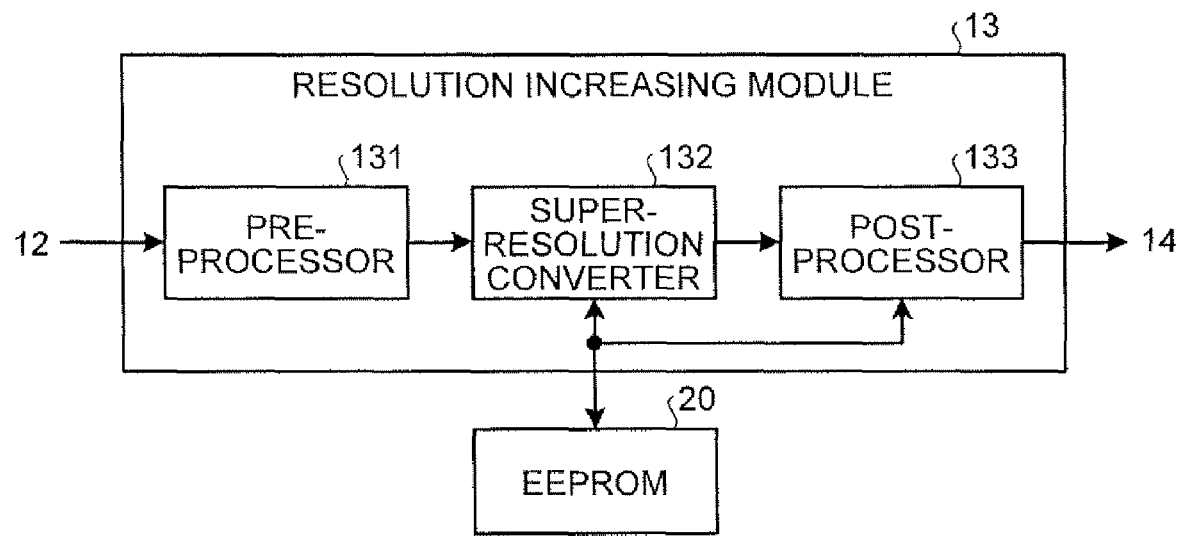
FIG. 4 is an exemplary block diagram of a resolution increasing module illustrated in FIG. 1.

The resolution increasing module 13 will then be described. FIG. 4 is a functional block diagram of the resolution increasing module 13. As illustrated in FIG. 4, the resolution increasing module 13 comprises a preprocessor 131, a super-resolution converter 132, a post-processor 133, and the EEPROM 20.

The preprocessor 131 performs image processing (hereinafter, "preprocessing") on the image signal received from the central processor 12, and then outputs it to the super-resolution converter 132. Examples of the preprocessing include interlace/progressive conversion and noise reduction to remove noise. When the function determination module 121 of the central processor 12 has determined that there is a matching process between the correction processes to be performed by the resolution increasing module 13 and the moving-image improving module 14, the preprocessor 131 also receives an identification signal indicating the matching process, and outputs it to the super-resolution converter 132.

As the interlace/progressive conversion, the preprocessor 131 detects motion of an image from the image signal and determines whether the image is a still image or a moving image. When the image is a still image, the preprocessor 131 performs still image interpolation. On the other hand, when the image is a moving image, the preprocessor 131 performs moving image interpolation.

As the noise reduction, the preprocessor 131 corrects the contour of the image, reduces image blur and glare, suppresses excessive equalizing (high-frequency enhancement), and corrects camera shake blur caused by the horizontal movement of a camera.

The super-resolution converter 132 performs image processing (hereinafter, "super resolution conversion") on a low-resolution frame received from the preprocessor 131 to increase the resolution, thereby generating a frame of high-resolution moving image data in HD size (hereinafter, "high-resolution frame"). The super-resolution converter 132 outputs the high-resolution frame to the post-processor 133.

The term "super resolution conversion" as used herein refers to image sharpening, in which, from an image signal with low resolution, i.e., first resolution, an original pixel value is estimated to increase the pixels and thus to restore an image signal with high resolution, i.e., second resolution. The original pixel value refers to the value of each pixel of an image signal obtained by, for example, photographing the same object as that of an image with low resolution (first resolution) with a camera having high-resolution pixels and capable of capturing an image with high resolution (second resolution).

Besides, "original pixel value is estimated to increase the pixels" means to obtain the characteristics of images to find a correlated image, and estimate an original pixel value from neighboring images (in the same frame or between frames) using the correlated image to increase the pixels. The super resolution conversion may be performed using known or commonly used technologies as disclosed in, for example, Japanese Patent Application Publication (KOKAI) Nos. 2007-310837, 2008-98803, and 2000-188680. In the embodiment, the super resolution conversion uses a technology of, for example, restoring an image with frequency components above the Nyquist frequency determined by the sampling rate of an input image.

If employing the super resolution conversion disclosed in Japanese Patent Application Publication (KOKAI) No. 2007-310837, the super-resolution converter 132 sets a target pixel in each of a plurality of frames of moderate resolution, and sets a target image area so that it contains the target pixel. The super-resolution converter 132 selects a plurality of correspondent points that correspond to a plurality of target image areas closest to a variation pattern of the pixel value in the target image area from the reference frame. The super-resolution converter 132 sets a sample value of luminance of a correspondent point to the pixel value of a corresponding target pixel. The super-resolution converter 132 calculates a pixel value for a high-resolution frame having more pixels than the reference frame and corresponding to the reference frame based on the size of a plurality of sample values and layout of the correspondent points. Thus, the super-resolution converter 132 estimates an original pixel value from a low-resolution image signal, and increases the pixels to restore a high-resolution image signal.

If employing the super resolution conversion using self-congruency position search in the same frame image disclosed in Japanese Patent Application Publication (KOKAI) No. 2008-98803, the super-resolution converter 132 calculates a first pixel position with the smallest error, i.e., a first error, by comparing errors of respective pixels in a search area of a frame of moderate resolution. The super-resolution converter 132 calculates a position with the smallest error in the search area with decimal precision based on the first pixel position and the first error, and a second pixel position around a first pixel and a second error thereof. The super-resolution converter 132 calculates a decimal-precision vector that has its end point at the position with the smallest error and its start point at a pixel of interest. The super-resolution converter 132 calculates an extrapolation vector of the decimal-precision vector that has its end point at a pixel on a screen which is not in the search area based on the decimal-precision vector. The super-resolution converter 132 calculates a pixel value for a high-resolution image having more pixels than an image signal based on a pixel value obtained from the image signal, the decimal-precision vector, and the extrapolation vector. In this manner, the super-resolution converter 132 estimates an original pixel value from a low-resolution image signal, and increases the pixels to restore a high-resolution image signal.

The super-resolution converter 132 may employ the super resolution conversion disclosed in Japanese Patent Application Publication (KOKAI) No. 2000-188680 using mapping between a plurality of frames.

The above technologies of the super resolution conversion are cited by way of example and not by way of limitation. The super-resolution converter 132 may employ various other technologies in which an original pixel value is estimated from a low-resolution image signal to increase the pixels to thereby obtain a high-resolution image signal.

Besides, image sharpening has been known in which the edge of an image is enhanced to sharpen the appearance of the image. The super resolution technology, however, is completely different from the image sharpening in that high-frequency component pixels are newly created.

Having received the image signal on which the preprocessor 131 has performed noise reduction, etc. and an identification signal indicating a matching process, if any, the super-resolution converter 132 outputs them to the post-processor 133.

Figure 5:
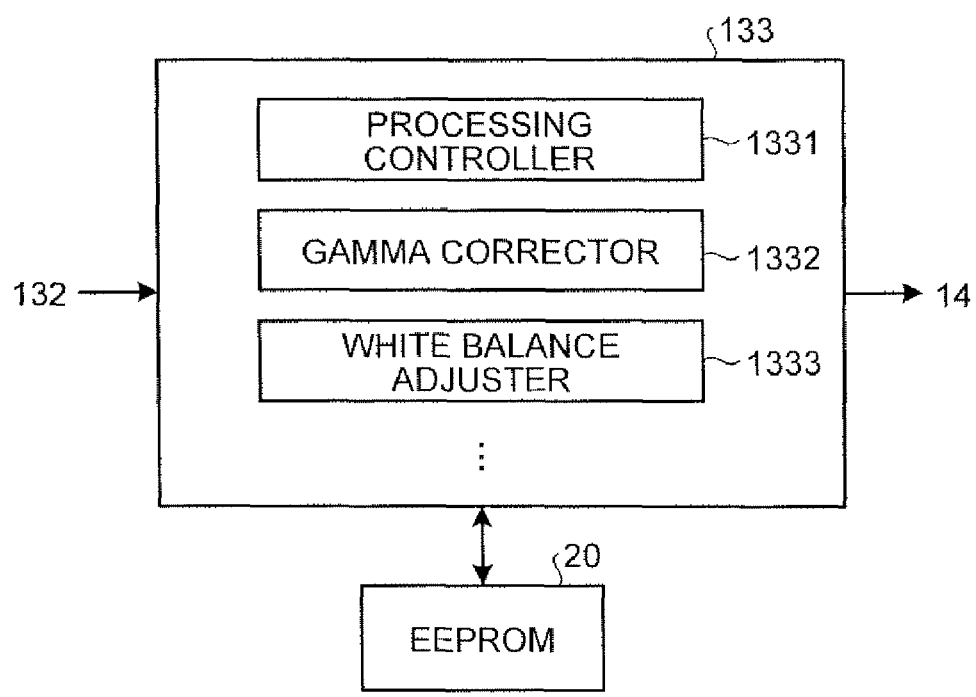
FIG. 5 is an exemplary block diagram of a post-processor illustrated in FIG. 4.

The post-processor 133 will then be described. FIG. 5 is a block diagram of the post-processor 133. As illustrated in FIG. 5, the post-processor 133 comprises a processing controller 1331, a gamma corrector 1332, and a white balance adjuster 1333. The post-processor 133 performs image correction (hereinafter, "post-processing") such as gamma correction and white balance adjustment on the image signal received from the super-resolution converter 132. Although gamma correction and white balance adjustment are cited below as examples of the correction processes, the following description is equally applicable to various other image correction processes such as tone or gray-level correction and contrast enhancement.

Having received the image signal from the super-resolution converter 132, the processing controller 1331 determines whether an identification signal has also been received that indicates a matching process between the correction processes to be performed by the resolution increasing module 13 and the moving-image improving module 14. Upon determining that an identification signal has been received, the processing controller 1331 issues an instruction to perform the correction processes except for the matching process. In the example of FIG. 5, the processing controller 1331 is notified by the central processor 12 and the super-resolution converter 132 that the moving-image improving module 14 at the latter stage has the function of white balance adjustment. Thus, the processing controller 1331 issues an instruction (hereinafter, "operation instruction") to the gamma corrector 1332 to perform its operation without issuing an operation instruction to the white balance adjuster 1333.

On the other hand, upon determining that no such an identification signal has been received, the processing controller 1331 issues an operation instruction to both the gamma corrector 1332 and the white balance adjuster 1333. After that, the processing controller 1331 outputs to the moving-image improving module 14 the image signal subjected to the correction processes by the gamma corrector 1332 and the white balance adjuster 1333.

On receipt of the operation instruction from the processing controller 1331, the gamma corrector 1332 performs predetermined gamma correction on the image signal according to the characteristics of a luminance signal contained therein.

On receipt of the operation instruction from the processing controller 1331, the white balance adjuster 1333 performs white balance adjustment on the image signal according to the color temperature of the image signal referring to the EEPROM 20.

Figures 6, 7:
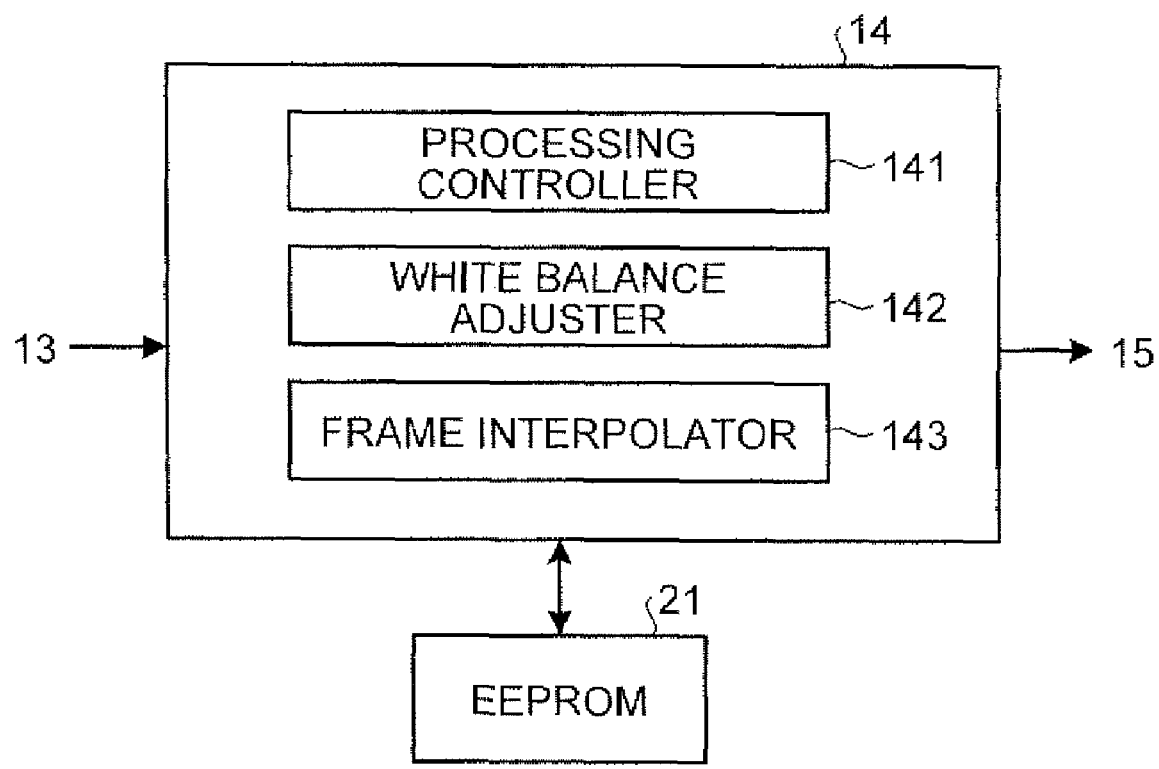
FIG. 6 is an exemplary table of parameters stored in an EEPROM illustrated in FIG. 5.
FIG. 7 is an exemplary block diagram of a moving-image improving module illustrated in FIG. 1.

FIG. 6 is an example of parameters stored in the EEPROM 20 for the operation of the white balance adjuster 1333. As illustrated in FIG. 6, the EEPROM 20 stores color temperatures each in association with a balance value. The white balance adjuster 1333 determines the color temperature from the image signal, and retrieves a balance value (−15 to +15) corresponding to the color temperature. The white balance adjuster 1333 then performs white balance adjustment on the image signal based on the balance value.

Although FIG. 6 exemplifies parameters, such as the balance value, for only white balance adjustment, such parameters are also stored for other modules including the gamma corrector 1332 so that they perform their correction processes based on the parameters.

The moving-image improving module 14 will then be described. FIG. 7 is a block diagram of the moving-image improving module 14. As illustrated in FIG. 7, the moving-image improving module 14 comprises a processing controller 141, a white balance adjuster 142, a frame interpolator 143, and the EEPROM 21. The moving-image improving module 14 performs double-speed processing on the image signal received from the post-processor 133.

On receipt of the image signal from the resolution increasing module 13, the processing controller 141 issues an operation instruction to the white balance adjuster 142 and the frame interpolator 143. After the white balance adjuster 142 and the frame interpolator 143 perform their operation on the image signal, the processing controller 141 receives it and outputs it to the display processor 15.

Although white balance adjustment is cited below as an example of the correction processes, as in the case of the post-processor 133 of the resolution increasing module 13, the correction processes may include various other image correction processes such as tone or gray-level correction.

The white balance adjuster 142 operates in a similar manner to the white balance adjuster 1333. More specifically, the white balance adjuster 142 retrieves a parameter, such as the one stored in the EEPROM 20 illustrated in FIG. 6, from the EEPROM 21, and then performs white balance adjustment on the image signal based on the parameter. For simplicity and ease of understanding, the white balance adjuster 1333 and the white balance adjuster 142 are described herein as performing white balance adjustment using the same parameter; however, they may, of course, use their individual parameters.

The frame interpolator 143 reads from the EEPROM 21 a previous frame immediately before (one frame preceding) a frame represented by the image signal output from the resolution increasing module 13. Through motion compensation, the frame interpolator 143 generates, based on the previous frame, a frame (hereinafter, "interpolation frame") to be interpolated between frames the resolution of which has been increased. The frame interpolator 143 then stores the interpolation frame in the EEPROM 21. More specifically, the moving-image improving module 14 converts the frame rate of a video signal transmitted at 60 frames per second (fps) to 120 fps. This reduces image blur in a portion in which an object moves horizontally, vertically, and diagonally or rotates as well as efficiently suppressing noise. Thus, a telop sequence, a sports scene with fast motion, etc. can be displayed clearly. The moving-image improving module 14 outputs the image signal subjected to the frame rate conversion to the display processor 15.

The interpolation may be performed by using an interpolation frame generated according to a commonly used method for interpolation of a frame such as the interpolation frame generating method based on motion vector detection by block matching disclosed in Japanese Patent Application Publication (KOKAI) No. 2008-35404. In addition, the number of interpolation frames may be arbitrarily determined.

As described above, it is desirable that such an interpolation frame be generated after the super-resolution processing is performed by the resolution increasing module 13. This is because, for example, if a motion vector is erroneously detected in a portion of an image represented by an image signal when an interpolation frame is generated before the super-resolution processing, the super-resolution processing is performed on the image signal containing block distortion. That is, upon display of the image signal, the block distortion cannot be distinguished from the contour of an object or a boundary between images and therefore is enhanced. As a result, image quality degrades.

Besides, from the viewpoint of the amount of signal processing, if performed after an interpolation frame is generated, the super-resolution processing needs to be performed at a frame rate twice as high as that of an input image subjected to the super-resolution processing because of the generation of the interpolation frame, resulting in increased costs. Obviously, this is more prominent as the number of interpolation frames increases.

The EEPROM 21 will then be described. The EEPROM 21 stores parameters that the white balance adjuster 142 uses to perform white balance adjustment. In addition, the EEPROM 21 stores a frame subjected to image processing by the resolution increasing module 13 and an interpolation frame generated by the frame interpolator 143.

The display processor 15 comprises a driver to output an image signal to the display module 16. On receipt of an image signal interpolated by the moving-image improving module 14, the display processor 15 outputs it to the display module 16. Thus, the display module 16 displays the image signal received from the moving-image improving module 14.

The display module 16 comprises a display panel such as a liquid crystal display (LCD) panel, a plasma panel, or a surface-conduction electron-emitter display (SED) panel. The display module 16 displays an image signal received from the display processor 15.

Figure 8:
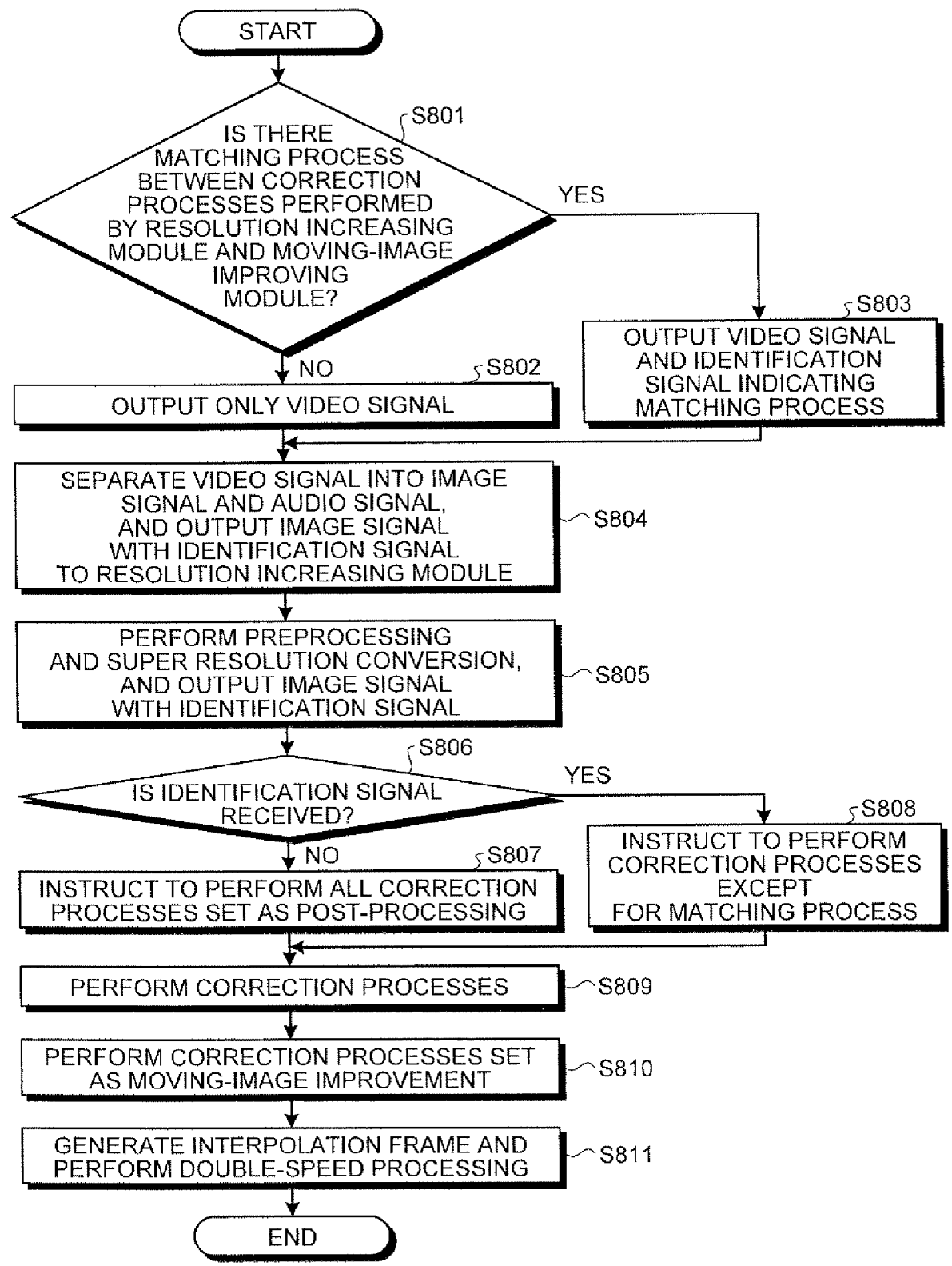
FIG. 8 is an exemplary flowchart of image corrections including the same correction processes in the embodiment.

Described below is the operation of the image display apparatus 100 configured as above. FIG. 8 is a flowchart of the operation the image display apparatus 100 from receipt of a video signal until display of an image after various image correction processes.

As illustrated in FIG. 8, on receipt of a video signal from the video signal input module 11, the function determination module 121 of the central processor 12 determines whether there is a matching process between correction processes to be performed by the post-processor 133 of the resolution increasing module 13 and the moving-image improving module 14 referring to the flash memory 19 (S801).

Upon determining that there is a matching process between the correction processes to be performed by the post-processor 133 of the resolution increasing module 13 and the moving-image improving module 14 (Yes at S801), the function determination module 121 outputs an identification signal indicating that they have the same image correction function to the controller 122 (S803). On the other hand, when determining that there is no matching process between the correction processes to be performed by the post-processor 133 of the resolution increasing module 13 and the moving-image improving module 14 (No at S801), the function determination module 121 outputs only the video signal to the controller 122 (S802).

On receipt of the video signal at S802 or the video signal with the identification signal indicating the matching process at S803, the controller 122 separates the video signal into an image signal and an audio signal. The controller 122 then outputs the image signal with the identification signal to the resolution increasing module 13 (S804).

The preprocessor 131 of the resolution increasing module 13 performs the preprocessing, such as noise reduction, on the image signal. The super-resolution converter 132 performs the super resolution conversion on the image signal, and outputs the image signal with the identification signal, if any, to the post-processor 133 (S805).

The processing controller 1331 of the post-processor 133 determines whether an identification signal indicating a matching process is received from the super-resolution converter 132 (S806). Upon determining that an identification signal is received (Yes at S806), the processing controller 1331 issues an operation instruction to perform the correction processes except for the matching process (S808).

On the other hand, upon determining that an identification signal is not received (No at S806), the processing controller 1331 issues an operation instruction to perform all the correction processes set as the post-processing (S807).

According to the operation instruction issued from the processing controller 1331 at S807 or S808, the white balance adjuster 1333 and the like perform the correction processes (S809). After that, the moving-image improving module 14 performs the correction processes set as the moving-image improvement (S810).

On completion of the correction processes at S810, the moving-image improving module 14 generates an interpolation frame for the image signal having undergone the correction processes and performs double-speed processing on the image signal (S811). The moving-image improving module 14 then outputs the image signal subjected to the double-speed processing to the display processor 15. Thus, the display module 16 displays as a video image the image signal subjected to the super resolution conversion and the double-speed processing.

In the above description, the function determination module 121 determines whether the post-processor 133 of the resolution increasing module 13 and the moving-image improving module 14 have the same image correction function. According to the determination, an operation instruction is issued to perform the same correction process by either one of the resolution increasing module 13 or the moving-image improving module 14. However, if the resolution increasing module 13 and the moving-image improving module 14 are provided by separate chips, the resolution increasing module 13 may be preset not to perform a correction process that the moving-image improving module 14 is capable of performing. FIG. 9 is a flowchart of the operation of the image display apparatus 100 in this case.

As illustrated in FIG. 9, the function determination module 121 directly outputs an input video signal (S901). Having received the video signal, as previously described in connection with FIG. 8, the controller 122 separates the video signal into an image signal and an audio signal (S902). Subsequently, the preprocessing and the super resolution conversion are performed on the image signal (S903).

Thereafter, the processing controller 1331 of the post-processor 133 issues an operation instruction to perform predetermined correction processes, i.e., those except for the same process as performed by the moving-image improving module 14 (S904). Then, as previously described in connection with FIG. 8, the correction processes set as the moving-image improvement and double-speed processing are performed on the image signal (S905 and S906).

By the operation as described above, image adjustment can be performed appropriately. That is, if white balance adjustment is performed as the moving-image improvement after the resolution increasing module performs white balance adjustment, the pixel value of a high-luminance pixel exceeds the dynamic range due to the white balance adjustment performed by the moving-image improving module. More specifically, even if white balance adjustment is originally performed appropriately within the dynamic range, when white balance adjustment is performed on a high-luminance pixel in a range R exceeding a certain threshold after white balance adjustment of the resolution increasing module, as illustrated in FIG. 10, its pixel value exceeds the maximum value of the dynamic range. This results in "clipped highlights".

According to the embodiment, the function determination module 121 of the central processor 12 compares correction processes to be performed by the resolution increasing module 13 with those to be performed by the moving-image improving module 14. If there is a matching process between the correction processes, the central processor 12 controls the resolution increasing module 13 and the moving-image improving module 14 so that only the moving-image improving module 14 performs the matching process. As a result, image adjustment, such as white balance adjustment, can be performed appropriately without causing "clipped highlights".

While white balance adjustment is described above as an example of the matching process, other image correction processes such as gamma correction may be the matching process, and the above description is equally applicable to this case. In other words, it is possible to prevent such an event that gamma correction is not performed correctly according to the gamma characteristics and an image is displayed with luminance different from the original value, i.e., a difference is caused between the hue of an image to be displayed and that of a corrected image. Thus, image adjustment can also be performed appropriately.

Moreover, when the resolution increasing module and the moving-image improving module are provided by separate chips, the image processing functions of the respective chips can be used appropriately. Thus, high-quality image display can be achieved.

The information processing apparatus of the embodiment is described by way of example as being applied to the image display apparatus 100 such as a digital TV comprising the display processor 15, the display module 16, the audio processor 17 and the audio output module 18; however, it can be applied to, for example, a tuner or a set-top box without having those modules.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a resolution increasing module configured to perform, on receipt of a first video signal with first resolution, super resolution conversion on the first video signal to obtain a second video signal with second resolution that is higher than the first resolution by estimating an original pixel value from the first video signal and increasing pixels, and perform first correction on the second video signal obtained by the super resolution conversion;
    a moving-image improving module configured to perform moving-image improvement processing on the second video signal obtained by the super resolution conversion subjected to the first correction, and perform second correction on the second video signal before or after the moving-image improvement processing; and
    a controller configured to determine whether the first correction comprises a matching correction process that matches a correction process comprised in the second correction, and, when the first correction comprises a matching correction process, control the resolution increasing module not to perform the matching correction process.

2. The image processing apparatus of claim 1, wherein the controller is configured to determine whether the second correction is disabled, and, when the second correction is disabled, control the resolution increasing module to perform the matching correction process.

3. The image processing apparatus of claim 1, further comprising a storage module configured to store a list of correction processes comprised in the first correction and the second correction, wherein
    the controller is configured to compare correction processes comprised in the first correction with correction processes comprised in the second correction referring to the list to determine whether there is a matching correction process.

4. The image processing apparatus of claim 1, wherein the first correction and the second correction comprise at least one of white balance adjustment and gamma correction, and a matching correction process is either white balance adjustment or gamma correction.

5. The image processing apparatus of claim 1, further comprising a display module configured to display the second video signal obtained by the super resolution conversion.

6. An image processing apparatus comprising:
    a resolution increasing module configured to perform super resolution conversion on a first video signal with first resolution to obtain a second video signal with second resolution that is higher than the first resolution, and perform first correction on the second video signal obtained by the super resolution conversion;
    a moving-image improving module configured perform moving-image improvement processing on the second video signal obtained by the super resolution conversion subjected to the first correction, and perform second correction on the second video signal before or after the moving-image improvement processing; and a controller configured to determine whether the first correction comprises a matching correction process that matches a correction process comprised in the second correction, and, when the first correction comprises a matching correction process, control the resolution increasing module not to perform the matching correction process.

7. An image processing apparatus comprising:

a resolution increasing module comprising a super-resolution converter configured to perform, on receipt of a first video signal with first resolution, super resolution conversion on the first video signal to obtain a second video signal with second resolution that is higher than the first resolution by estimating an original pixel value from the first video signal and increasing pixels, and a first corrector configured to perform correction on either the first video signal or the second video signal; and a moving-image improving module comprising a moving-image improver configured to receive the second video signal and perform moving-image improvement on the second video signal, and a second corrector configured to perform correction on the second video signal before or after the moving-image improvement processing, wherein when a correction process performed by the first corrector matches a correction process performed by the second corrector, the first corrector does not perform the correction process, while the second corrector performs the correction including the correction process.

8. The image processing apparatus of claim 7, wherein each of the first corrector and the second corrector comprises a function of white balance adjustment and a function of gamma correction, and a correction process is either white balance adjustment or gamma correction.

* * * * *